(12) United States Patent
Gordon

(10) Patent No.: US 6,352,226 B1
(45) Date of Patent: Mar. 5, 2002

(54) MONITOR LIFT APPARATUS

(75) Inventor: Seth A. Gordon, Eugene, OR (US)

(73) Assignee: Rosen Products, LLC, Eugene, OR (US)

( * ) Notice: Subject to any disclaimer, the term of this patent is extended or adjusted under 35 U.S.C. 154(b) by 0 days.

(21) Appl. No.: 09/563,799

(22) Filed: May 2, 2000

Related U.S. Application Data

(60) Provisional application No. 60/160,047, filed on Oct. 18, 1999.

(51) Int. Cl.[7] .............................. A47F 5/00; A47F 7/00; F16M 11/00; F16M 13/00
(52) U.S. Cl. .................................... 248/125.2; 248/917
(58) Field of Search ........................ 248/125.2, 295.11, 248/296.1, 297.21, 125.1, 917, 919; 49/325, 352, 360; 312/319.6, 223.1, 7.2

(56) References Cited

U.S. PATENT DOCUMENTS

| | | | |
|---|---|---|---|
| 3,862,734 A | * | 1/1975 | Buchin et al. .............. 248/123 |
| 3,917,209 A | | 11/1975 | Adams |
| 4,381,714 A | | 5/1983 | Henneberg et al. |
| 4,382,573 A | | 5/1983 | Aondetto |
| 4,516,777 A | * | 5/1985 | Nikora .................... 273/148 B |
| 4,573,657 A | | 3/1986 | Sakamoto |
| 5,007,608 A | * | 4/1991 | Carroll, Jr. ............... 248/297.2 |
| 5,145,136 A | | 9/1992 | McConnell |
| 5,181,771 A | | 1/1993 | Robak et al. |
| 5,240,215 A | * | 8/1993 | Moore ........................ 248/278 |
| 5,271,182 A | * | 12/1993 | Greisner et al. .............. 49/325 |
| 5,362,144 A | * | 11/1994 | Shioya et al. ............ 312/319.6 |
| 5,374,104 A | | 12/1994 | Moore et al. |
| 5,433,376 A | | 7/1995 | Kueshner |
| 5,547,248 A | | 8/1996 | Marechal |
| 5,598,788 A | | 2/1997 | Jonker |
| 5,732,919 A | | 3/1998 | Rosen et al. |
| 5,847,685 A | * | 12/1998 | Otsuki .......................... 345/87 |
| 6,189,849 B1 | * | 2/2001 | Sweere et al. ........... 248/286.1 |
| 6,220,567 B1 | * | 4/2001 | Buelow ........................ 251/90 |

FOREIGN PATENT DOCUMENTS

DE  19 20 696  6/1978

* cited by examiner

Primary Examiner—Ramon O. Ramirez
Assistant Examiner—A. Joseph Wujciak
(74) Attorney, Agent, or Firm—Kolisch, Hartwell, Dickinson, McCormack & Heuser

(57) ABSTRACT

A monitor lift apparatus is provided which includes a frame and a carriage-mounted monitor configured for travel between a stowed position and a presented position along a flexible track. The carriage typically includes a rotary drive element which traverses the flexible track to effect travel of the carriage and monitor between the stowed and presented positions. The flexible track may take the form of a chain, belt, or cable, and typically extends between upper and lower ends of the frame so as to provide for vertical deployment/stowage of the monitor. The monitor may be secured in position using a latch pin which is mounted on the carriage to selectively engage the frame. Correspondingly, the frame may define a one or more detents for receipt of the latch pin.

22 Claims, 5 Drawing Sheets

MONITOR LIFT APPARATUS

CROSS REFERENCE TO RELATED APPLICATION

This application claims priority from U.S. Provisional Patent Application Ser. No. 60/160,047, filed Oct. 18, 1999 of Seth Gordon entitled MONITOR LIFT APPARATUS.

TECHNICAL FIELD

This invention relates generally to display monitor lift systems useful where space is limited and the monitor may need to be stowed out of the way when not in use. More particularly, it concerns a monitor lift apparatus which employs a flexible track configured to define a path for traverse by a drive element to effect travel of a monitor between a stowed position and a presented position.

BACKGROUND ART

In confined places such as aircraft passenger compartments, space is at a premium, particularly when it comes to allocation of such space to non-essential appliances such as display monitors or the like. Nevertheless, display monitors are important to many travelers, both for entertainment and as an effective business tool. In order to be useful in aircraft passenger compartments, however, such monitors typically must be provided with the capability of being stowed out of the way of the passengers and crew when not in use. Such monitors also preferably are deployable/stowable quickly and are easily positionable by the user during flight. Onboard display monitors thus typically are mounted as nearby as possible to passengers, often being built into the passenger's seat or an adjacent structure.

Because of the relatively low-slung seats that are typical of most commercial and private aircraft, unusual vertical space limitations may constrain the ability to deploy/stow a monitor of conventional design. Accordingly, it would be useful to provide a monitor lift apparatus which accommodates easy deployment/stowage of a monitor without utilizing excessive amounts of space. It also would be useful to provide a monitor lift apparatus which provides for secure stowage of the monitor when not in use.

SUMMARY OF THE INVENTION

Briefly, the invented lift apparatus includes a frame and a carriage-mounted monitor configured for travel between a stowed position and a presented position along a flexible track. The carriage typically includes a rotary drive element which traverses the flexible track to effect travel of the carriage and monitor between the stowed and presented positions. The flexible track may take the form of a chain, belt, or cable, and typically extends between upper and lower ends of the frame so as to provide for vertical deployment/stowage of the monitor. The carriage may include first and second rotary drive elements, the second drive element being laterally offset from the first rotary drive element such that the flexible track extends about the first and second drive elements along a generally S-shaped path. Typically, the first rotary drive element serves to drive the carriage along the flexible track. The second rotary drive element acts as a idler to adjust tension in the flexible track and to provide sufficient engagement between the rotary drive elements and the flexible track. This configuration maintains tension in the flexible track.

The monitor may be secured in position using a latch pin which is mounted on the carriage to selectively engage the frame. Correspondingly, the frame may define a one or more detents for receipt of the latch pin. In one embodiment, the latch pin is biased toward a deployed orientation wherein the latch pin engages the frame, but a solenoid in operative relation with the latch pin is configured selectively to remove the latch pin from the deployed orientation. The solenoid may be activated/deactivated based on information provided by one or more sensors which detect the position of the carriage and/or monitor.

These and other advantages and features of the invention will become more fully apparent when the detailed description below is read with reference to the accompanying drawings.

DETAILED DESCRIPTION OF THE PREFERRED EMBODIMENT

Figure 1:
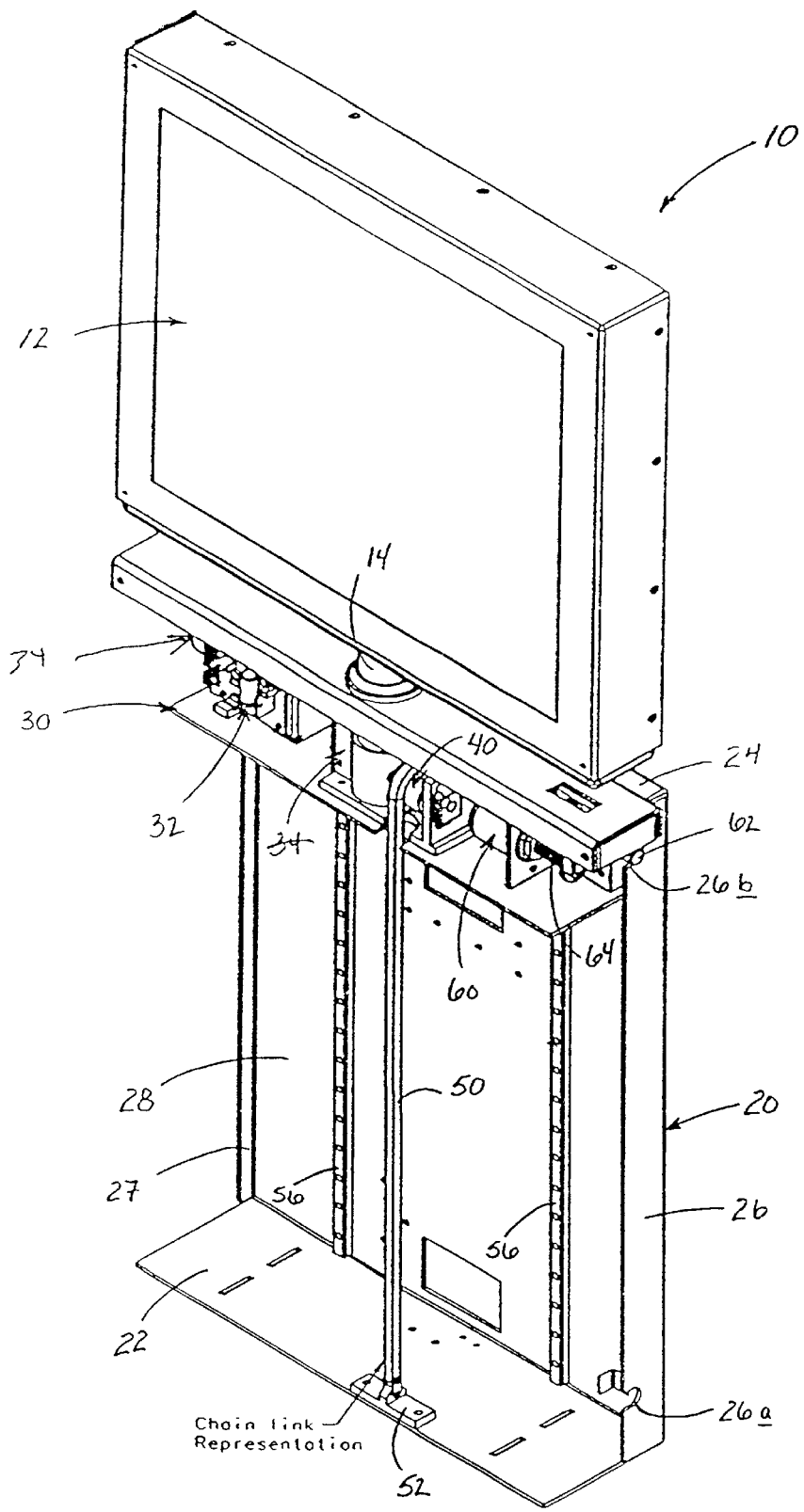
FIG. 1 is an isometric view depicting a monitor lift apparatus constructed in accordance with the present invention, the monitor/carriage being shown in a deployed position.

Referring to FIG. 1, the invented apparatus is shown at 10 in isometric view. Apparatus 10 may be seen to include a generally rectangular, substantially open frame 20 including a base plate 22, a top plate 24, right and left side-walls 26, 27, and a rear wall 28. The frame is configured for placement in a cavity formed in an aircraft seat, bulkhead, or adjacent structure. A monitor 12 is mounted on the frame, typically via a mounting structure such as carriage 30, which carries the monitor between a presented position (FIG. 1) and a stowed position (FIG. 2) as will be described herein. The monitor also typically is pivotal about an axis defined by a neck 14 which supports the monitor above the carriage.

As indicated, carriage 30 includes control circuitry 32 which directs movement of the carriage, and which further directs operation of a latch mechanism as hereinafter described. The carriage is moved via a drive mechanism, the drive mechanism typically taking the form of an onboard motor 34 configured to incrementally raise and lower the carriage. Accordingly, the monitor, which is mounted on the carriage, is raised and lowered by operation of motor 34.

Figure 3:
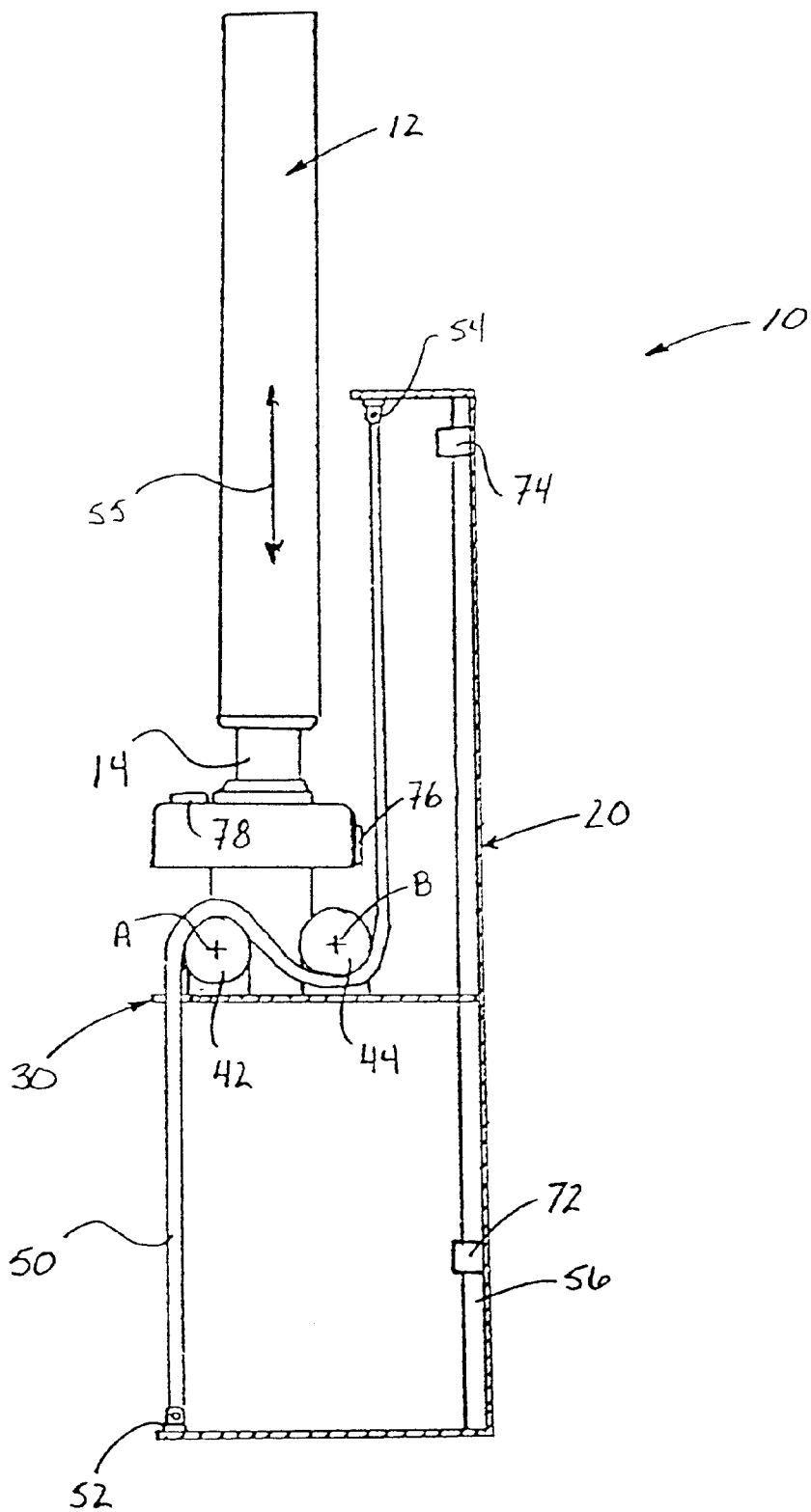
FIG. 3 is a somewhat simplified side sectional view of the monitor lift apparatus taken along lines 3—3 of FIG. 2.

In the depicted embodiment, the motor operates a gear arrangement 40 which is configured to traverse a flexible track 50. As shown in FIG. 3, gear arrangement 40 typically includes a first rotary drive element 42 and a second rotary drive element 44. First rotary drive element 42 is configured for rotation about a first axis A under direction of the onboard motor. Second rotary drive element 44 is configured for rotation about a second axis B, typically in unison with the first rotary drive element. The drive elements are mounted on the carriage in aligned, spaced relation, defining a generally S-shaped path through which flexible track 50 is threaded.

As a safety feature, the motor typically operates via a one-way clutch. When the monitor is stowed, it falls under its own weight, speed of fall being regulated by the motor. Any obstruction is only subjected to the weight of the monitor and carriage. A friction clutch may be employed to prevent damage to the motor and/or drive elements in the event of an obstruction which prevents the motor from deploying. If something prevents the motor from reaching its intended designation within a predetermined period of time, the control circuitry may effect a power-down of the motor in order to preserve power.

Referring still to FIG. 3, it will be noted that flexible track 50 extends between opposite ends of frame 20. A first end of the track is secured to base plate 22 via connector 52. A second end of the track is secured to top plate 24 via connector 54. The track is of a length which accommodates passage thereof through the generally S-shaped path defined by the drive elements, but which maintains sufficient tension in the track to frictionally support the carriage at various elevations. The carriage thus may be raised and lowered (as indicated by arrow 55) by rotation of the rotary drive elements to effect travel thereof along the flexible track.

The flexible track may take any of a variety of forms, but most typically takes the form of a chain. The rotary drive elements thus typically take the form of toothed sprockets which matingly engage the chain. Such mating combination will be understood to prevent slippage of the chain, and thus may be considered to provide for frictional support of the carriage at the various desired carriage elevations. Alternatively, the flexible track may take the form of a belt, or of a cable, either of which is suited for frictional relation with a corresponding rotary drive element to prevent slippage.

Figure 2:
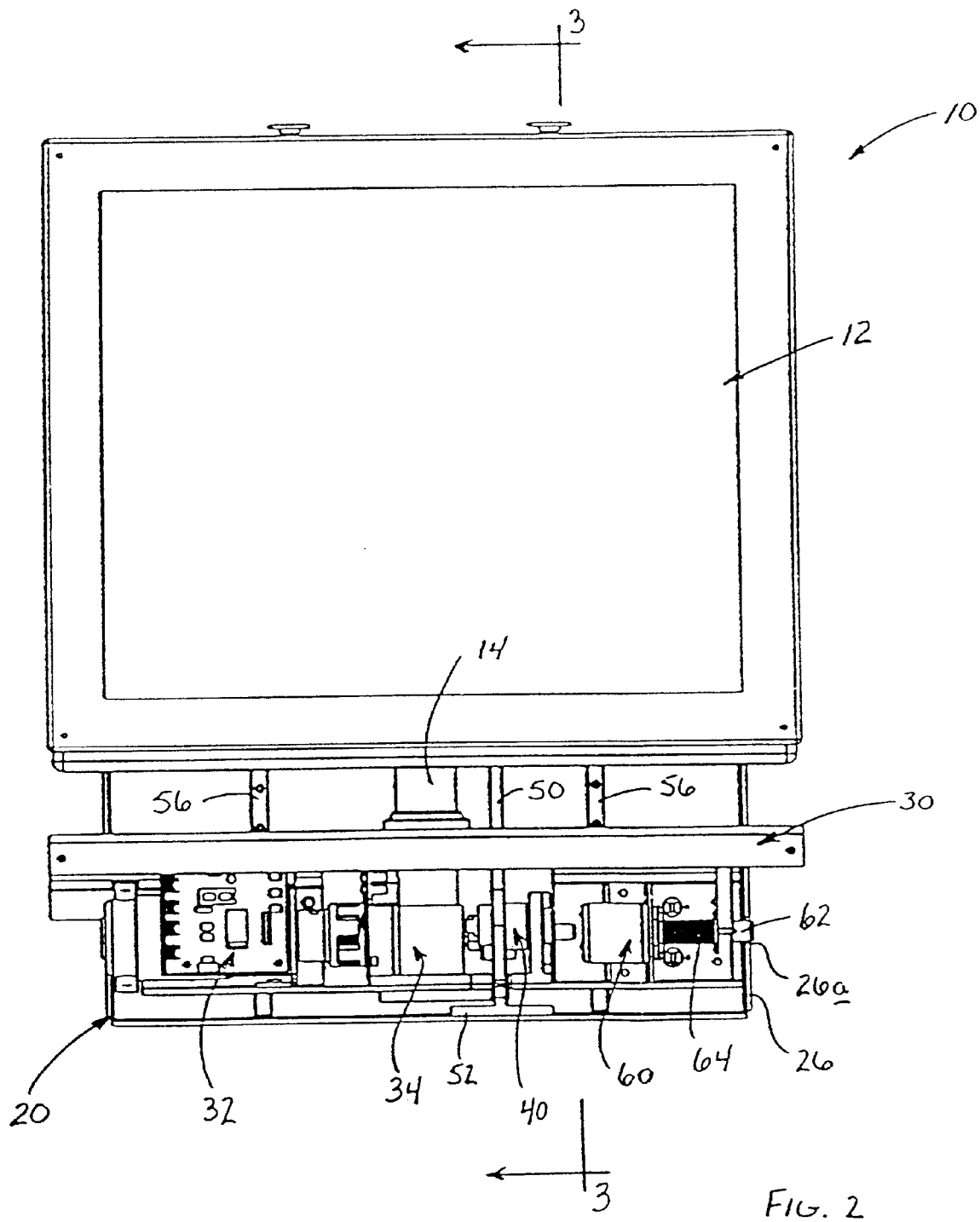
FIG. 2 is a front view of the monitor lift apparatus shown in FIG. 1, but with the monitor/carriage in a stowed position.

When the carriage is adjacent the base plate, it is in a stowed position (FIG. 2). Correspondingly, when the carriage is so-positioned, the monitor is stowed within the frame. Upon raising the carriage to a position adjacent the top plate, the carriage is placed in a presented position. Correspondingly, the monitor is presented to desired individuals for viewing. It also will be noted that the frame may be provided with a pair of rails 56 which correspond with grooves in the carriage to aid in directing passage of the carriage between the stowed and presented positions.

Figure 2A:
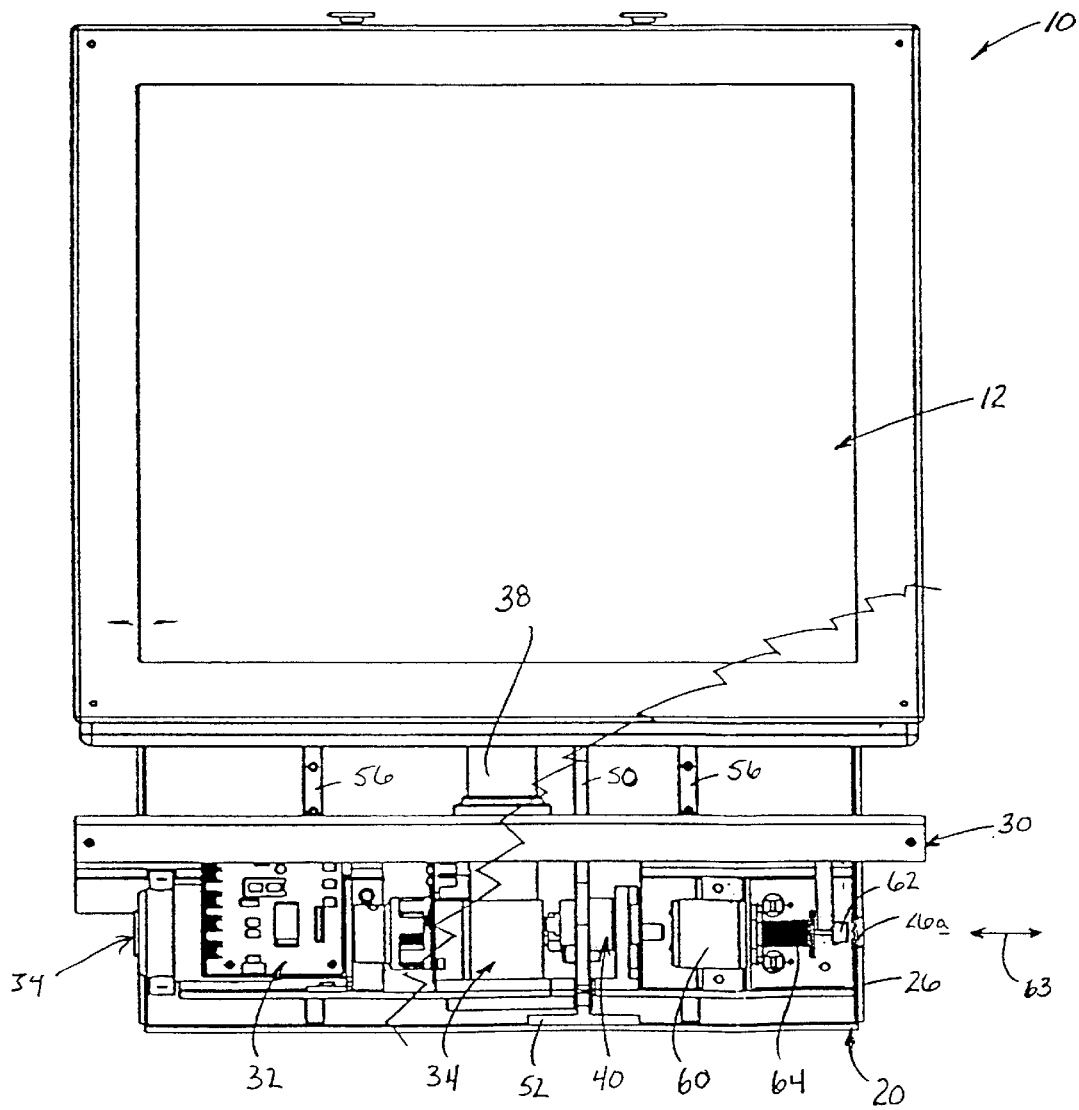
FIG. 2A is a fragmentary front view showing a latch pin of the monitor lift apparatus in a non-deployed orientation.

As indicated in FIGS. 1, 2 and 2A, lift apparatus 10 also includes a latch mechanism which is configured selectively to secure the carriage in position. The latch mechanism typically includes a solenoid 60, the solenoid being mounted on the carriage and operated by control circuit 32 as described above. A latch pin 62 thus may be selectively deployed (as indicated by arrow 63) so as to engage the frame to maintain carriage position.

In one embodiment, the latch pin is biased toward a deployed orientation via a spring 64 so as to nominally urge the latch pin into engagement with frame side-wall 26. The solenoid is in operative relation with the latch pin and is configured selectively to remove the latch pin from the deployed orientation upon activation of the solenoid, thereby accommodating movement of the carriage.

According to one aspect of the invention, the frame may be constructed with one or more detents, each configured for fitted receipt of the latch pin so as to lock the carriage in place. A first detent 26a, for example, is provided adjacent the lower end of side-wall 26 so as to provide a seat for latch pin 62 when the carriage is in the stowed position. A second detent 26b is provided adjacent the upper end of side-wall 26 so as to provide a seat for latch pin 62 when the carriage is in the presented position.

Those skilled in the art will appreciate that one or more latch pins may be used to maintain the stowed and presented positions of carriage 30. Typically, a first releasable latch pin will engage side-wall 26, and a second releasable latch pin will engage side-wall 27 for maintaining the carriage in its desired position. Other variations in the way in which one or more latch pins to securely maintain the carriage in its stowed and presented positions are contemplated and are within the scope of the invention.

The depicted lift apparatus also typically employs a sensor arrangement wherein one or more sensors may be used to determine the position of the carriage. Referring again to FIG. 3, for example, it will be noted that frame 20 has been provided with a pair of flags 72, 74 which interrupt corresponding sensors 76 mounted on the carriage. Each sensor, it will be understood, has an LED light source built in to it. Flag 72 is mounted adjacent the lower end of the frame, and is thus configured to signify presence of the carriage in the stowed position. Flag 74 is mounted adjacent the upper end of the frame, and is thus configured to signify presence of the carriage in the presented position.

Those skilled will appreciate that the exemplary sensor arrangement described herein may be varied within the scope of the invention. For example, frame 20 may be provided with a pair of optical sensors. Carriage 30 then may be provided with a light source which impinges on one or the other of the optical sensors upon placement of the carriage into a corresponding one of predetermined positions. Similarly, one or more sensors may be placed on the carriage such that they will detect one or more light sources mounted on the frame. Alternatively, various other sensors, optical or otherwise, may be employed to detect carriage position.

In one embodiment of the invention, the monitor may be pivotal about an axis defined by neck 14. Monitor 12 is pivotable, preferably through 180° rotation, only when the carriage is in its fully presented position. It will be appreciated that, when the monitor is not fully presented, left and right side-walls 26, 27 prevent more than slight rotation thereof. Furthermore, when the monitor is pivoted to a non-aligned monitor orientation, the monitor orientation will impede stowage of the monitor. Accordingly, the lift apparatus may be provided with a third sensor 78 configured to detect placement of the monitor in a predetermined aligned monitor orientation. Upon such placement, it will be possible to effect stowage of the monitor.

Figure 4:
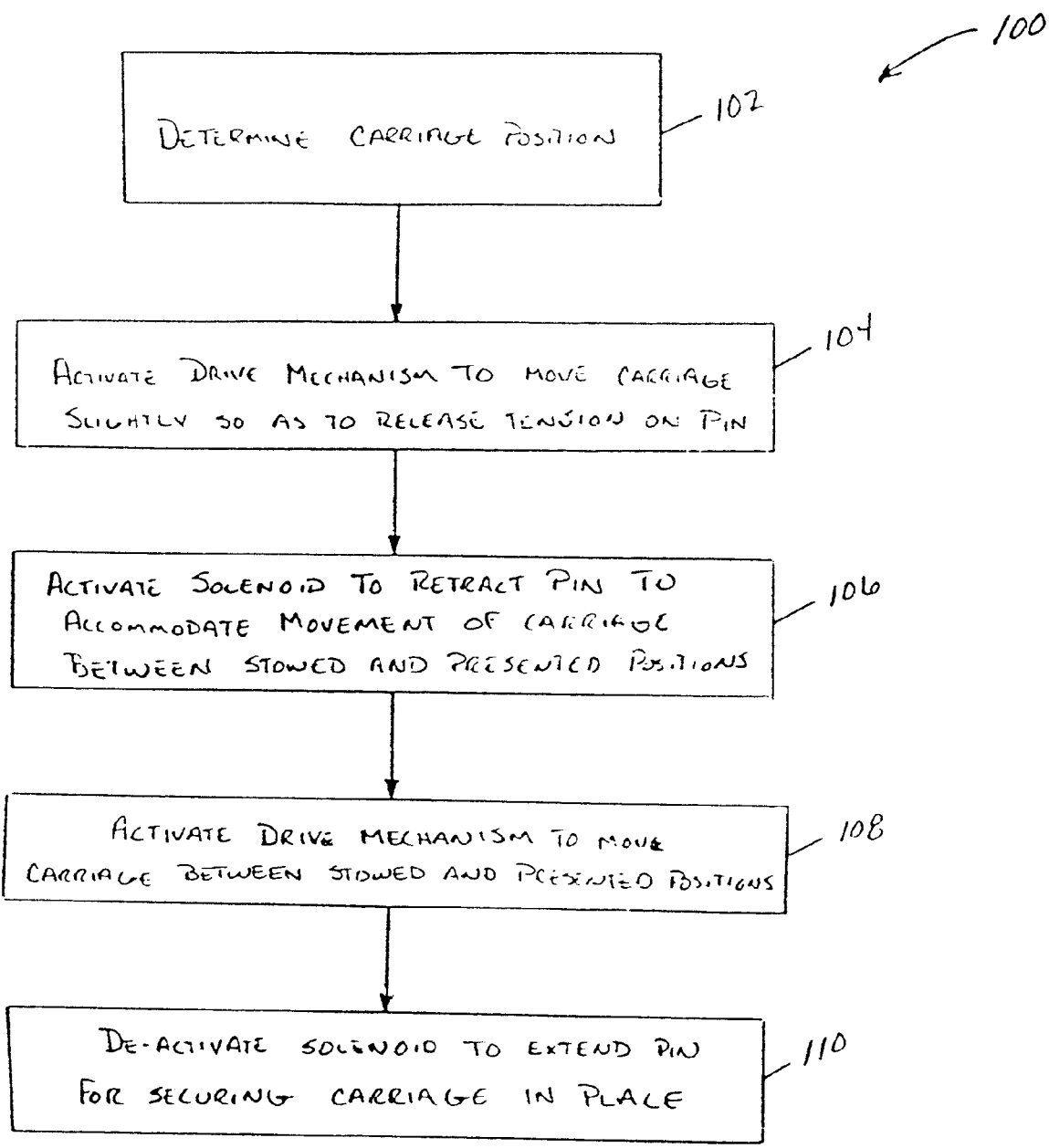
FIG. 4 is a flow chart showing a method whereby a monitor carriage is moved between a stowed position where the carriage is secured in place via a retractable latch and a presented position where the carriage is secured in place via the retractable latch pin.

In operation, it will be understood that the invented apparatus may be used to present display monitor 12 in accordance with a method 100 whereby a monitor carriage is moved between a stowed position where the carriage is secured in place via a retractable latch and a presented position where the carriage is secured in place via the retractable latch pin. As shown in FIG. 4, the method involved steps of determining carriage position 102, activating a drive mechanism to move the carriage slightly so as to release tension on the latch pin 104, activating a solenoid to retract the latch pin to accommodate movement of the carriage between the stowed position and the presented position 106, activating the drive mechanism to move the carriage between the stowed position and the presented position 108, and de-activating the solenoid to extend the latch pin for securing the carriage in place 110. The method also may involve, prior to activating the drive mechanism to move the carriage, determining whether the monitor is in a predetermined aligned orientation.

While the present invention has been shown and described with reference to the foregoing embodiment, it is to be understood by those of skill in the art that other changes in form and detail may be made therein without departing from the spirit and scope of the invention as defined in the appended claims.

I claim:

1. A lift apparatus for use in presenting a stowable monitor, the apparatus comprising:

a frame having a first end and a second end;

a carriage configured for travel between a stowed position adjacent the first end of the frame and a presented position adjacent the second end of the frame, the carriage including a first rotary drive element;

a flexible track extending between the first end of the frame and the second end of the frame to define a path for traverse by the first rotary drive element to effect travel of the carriage between the stowed position and the presented position; and wherein the carriage further includes a second rotary drive element laterally offset from the first rotary drive element, the flexible track extending about the first rotary drive element and about the second rotary drive element along a generally S-shaped path.

2. The lift apparatus of claim 1 wherein the carriage further includes a drive mechanism configured to rotate the first rotary drive element to effect traverse of the first rotary drive element along the flexible track, and thus to effect travel of the carriage along the flexible track.

3. The lift apparatus of claim 1 wherein the flexible track is a chain.

4. The lift apparatus of claim 3, wherein the first rotary drive element is a sprocket configured for mating engagement with the chain to accommodate passage of the sprocket along the chain.

5. The lift apparatus of claim 1 wherein the flexible track is a belt.

6. The lift apparatus of claim 1 wherein the flexible track is a cable.

7. The lift apparatus of claim 1 wherein the carriage further includes a latch pin which is selectively deployable to engage the frame to secure the carriage in place.

8. The lift apparatus of claim 7 wherein the frame defines a first detent for receipt of the latch pin to secure the carriage in a stowed position.

9. The lift apparatus of claim 8 wherein the frame defines a second detent for receipt of the latch pin to secure the carriage in a presented position.

10. The lift apparatus of claim 7 wherein the latch pin is biased toward a deployed orientation wherein the latch pin engages the frame.

11. The lift apparatus of claim 10 wherein the carriage further includes a solenoid in operative relation with the latch pin and configured selectively to remove the latch pin from the deployed orientation.

12. A lift apparatus for use in presenting a stowable monitor, the apparatus comprising:

a frame having a first end and a second end;

a carriage configured for travel between a stowed position adjacent the first end of the frame and a presented position adjacent the second end of the frame, the carriage including a first rotary drive element;

a flexible track extending between the first end of the frame and the second end of the frame to define a path for traverse by the first rotary drive element to effect travel of the carriage between the stowed position and the presented position; and a first carriage sensor configured to detect presence of the carriage in the stowed position.

13. The lift apparatus of claim 12, which further comprises a second carriage sensor configured to detect presence of the carriage in the presented position.

14. A lift apparatus which presents a stowable monitor, the apparatus comprising:

a frame having a first end and a second end;

a carriage configured for travel between a stowed position adjacent the first end of the frame and a presented position adjacent the second end of the frame, the carriage including a first rotary drive element;

a flexible track extending between the first end of the frame and the second end of the frame to define a path for traverse by the first rotary drive element to effect travel of the carriage between the stowed position and the presented position; and a monitor sensor configured to detect placement of the monitor upon movement of the monitor about a monitor pivot axis to a predetermined monitor orientation.

15. A lift apparatus for presenting a stowable monitor, the apparatus comprising:

a frame having a first detent and a second detent;

a carriage mounted on the frame for movement between a stowed position and a presented position, the carriage including a latch pin biased toward fitted engagement with the first detent when the carriage is in the stowed position and biased toward fitted engagement with the second detent when the carriage is in the presented position, and including a solenoid configured selectively to disengage the latch pin upon activation of the solenoid; and a flexible track extending between a first end of the frame and a second end of the frame, and wherein the carriage further includes a first rotary drive element and a second rotary drive element configured to thread the flexible track through a generally S-shaped flexible track path.

16. The lift apparatus of claim 15, wherein the flexible track is a chain.

17. The lift apparatus of claim 16 wherein the first rotary drive element and second rotary drive elements are sprockets configured for mating engagement with the chain to accommodate passage of the sprockets along the chain.

18. The lift apparatus of claim 15 wherein the flexible track is a belt.

19. The lift apparatus of claim 15, wherein the flexible track is a cable.

20. The lift apparatus of claim 15 wherein the carriage further includes a drive mechanism configured to rotate the first rotary drive element to effect traverse of the first rotary drive element along the flexible track, and thus to effect travel of the carriage along the flexible track.

21. A lift apparatus for presenting a stowable monitor, the apparatus comprising:

a frame having a first detent and a second detent;

a carriage mounted on the frame for movement between a stowed position and a presented position, the carriage including a latch pin biased toward fitted engagement with the first detent when the carriage is in the stowed position and biased toward fitted engagement with the second detent when the carriage is in the presented position, and including a solenoid configured selectively to disengage the latch pin upon activation of the solenoid; and a first carriage sensor configured to detect presence of the carriage in the stowed position and a second carriage sensor configured to detect presence of the carriage in the presented position.

22. A lift apparatus which presents a stowable monitor, the apparatus comprising:

a frame having a first detent and a second detent;

a carriage mounted on the frame for movement between a stowed position and a presented position, the carriage including a latch pin biased toward fitted engagement with the first detent when the carriage is in the stowed position and biased toward fitted engagement with the second detent when the carriage is in the presented position, and including a solenoid configured selectively to disengage the latch pin upon activation of the solenoid; and a monitor sensor configured to detect placement of the monitor upon movement of the monitor about a monitor pivot axis to a predetermined monitor orientation.

* * * * *